United States Patent [19]

Jensen

[11] Patent Number: 5,214,560
[45] Date of Patent: May 25, 1993

[54] MICROPROCESSOR WATCH-DOG MONITOR FOR ELECTRONIC TRIP UNITS

[75] Inventor: Scott R. Jensen, Cedar Rapids, Iowa

[73] Assignee: Square D Company, Palatine, Ill.

[21] Appl. No.: 901,364

[22] Filed: Jun. 19, 1992

[51] Int. Cl.⁵ .......................................... H03M 13/00
[52] U.S. Cl. ...................................... 361/93; 371/66; 361/97
[58] Field of Search ............... 361/93, 94, 97, 92; 364/483, 184; 371/66

[56] References Cited

U.S. PATENT DOCUMENTS

| | | | |
|---|---|---|---|
| 5,017,846 | 5/1991 | Young et al. | 318/244 |
| 5,089,928 | 2/1992 | Durivage, III et al. | 361/94 |
| 5,151,854 | 9/1992 | Adams et al. | 361/92 |
| 5,166,887 | 11/1992 | Farrington et al. | 364/483 |

Primary Examiner—Todd E. DeBoer
Attorney, Agent, or Firm—Larry I. Golden; Kareem M. Irfan

[57] ABSTRACT

A microprocessor watch-dog monitor for electronic trip units includes an input transistor (Q1), a timing circuit (16), and a comparator circuit (18). The comparator circuit is formed of a first bipolar transistor (Q3) of the PNP-type conductivity and a second bipolar transistor (Q4) of the NPN-type conductivity.

15 Claims, 2 Drawing Sheets

MICROPROCESSOR WATCH-DOG MONITOR FOR ELECTRONIC TRIP UNITS

BACKGROUND OF THE INVENTION

This invention relates generally to solid-state circuit interrupters in electrical distribution systems and more particularly, it relates to an improved microprocessor watch-dog monitor for electronic trip units used in circuit interrupters so as to maintain the integrity of the trip units.

As is generally well-known in the art, circuit breakers have been widely used in commercial and industrial applications for protecting electrical conductors and apparatus connected thereto from damage due to excessive current flow. Circuit breakers typically included trip systems which were designed to interrupt when the current flowing through them exceeded a predetermined level. Specifically, most simple trip systems utilized an electromagnet to trip the circuit in response to current or voltage fluctuations. The electromagnet provided a magnetic field in response to current flowing through the circuit breaker. When the current level increased beyond the predetermined level or trip point, the magnetic field "trips" a mechanism which causes a set of circuit breaker contacts to release, thereby "opening" or "breaking" the circuit path.

Gradually, however, there has arisen a need in the industry for more sophisticated and elaborate tripping systems as the complexity of electrical distribution systems increased. For example, in many commercial and industrial equipment today it is desired to have circuit breakers that perform both an instantaneous and delayed tripping (i.e., time-current interrupting characteristics) so as to provide improved accuracy and flexibility on the equipment to be controlled. For this reason, many microprocessor-based solid-state circuit interrupters have been also developed in the prior art in an attempt to provide more accurate and reliable control operations on the electrical distribution system on which the circuit interrupter was being employed. To this end, a microcomputer is provided which is coupled between the current path and a trip solenoid controlling the mechanism for breaking the current path. The microcomputer stores trip points which activate the trip solenoid when the current within the current path exceeds the trip points.

Therefore, in order to enhance system dependability there is generally required a watch-dog circuit for protecting the tripping system in the event of a microcomputer malfunction. Prior art watch-dog circuits are known to exist which include either an operational amplifier or a discrete programmable unijunction transistor. While these prior art circuits performed their function adequately, they suffer from the disadvantage of being high in cost and having a low reliability.

Accordingly, the present invention is directed to an improved microprocessor watch-dog monitor which provides for more reliable operation and performance at a reduced cost. Specifically, the microprocessor watch-dog monitor of the instant invention includes a comparator circuit formed of a first bipolar transistor of the PNP-type conductivity and a second bipolar transistor of the NPN-type conductivity.

SUMMARY OF THE INVENTION

Accordingly, it is a general object of the present invention to provide an improved microprocessor watch-dog monitor for electronic trip units which is relatively simple and economical to manufacture and assemble, but yet overcomes the disadvantages of the prior art circuits.

It is an object of the present invention to provide an improved microprocessor watch-dog monitor for electronic trip units which has a high reliability in its operation.

It is another object of the present invention to provide an improved microprocessor watch-dog monitor for electronic trip units which is formed of components with relatively low cost.

It is still another object of the present invention to provide an improved microprocessor watch-dog monitor for electronic trip units which includes a comparator circuit formed of a first bipolar transistor of the PNP-type conductivity and a second bipolar transistor of the NPN-type conductivity.

In accordance with these aims and objectives, the present invention is concerned with the provision of and improved microprocessor watch-dog monitor for electronic trip units which includes an input transistor, a timing circuit, and a comparator circuit. The input transistor has its gate coupled to an input terminal and its source connected to a ground potential. A first resistor has its one end connected to the drain of the input transistor and its other end connected to an internal node. The timing circuit is formed of a second resistor and a capacitor. The second resistor has its one end connected to a power supply potential and its other end connected to one end of the capacitor and to the internal node. The other end of the capacitor is connected to the ground potential.

The comparator circuit is formed of a first switching transistor and a second switching transistor. The first switching transistor has its emitter connected to the internal node. The second switching transistor has its base connected to the collector of the first switching transistor, its collector connected to the base of the first switching transistor, and its emitter coupled to an output terminal. A voltage divider is formed of third and fourth resistors. The third resistor has its one end connected to the power supply potential and its other end connected to the collector of the second switching transistor and to one end of the fourth resistor. The other end of the fourth resistor is connected to the ground potential.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
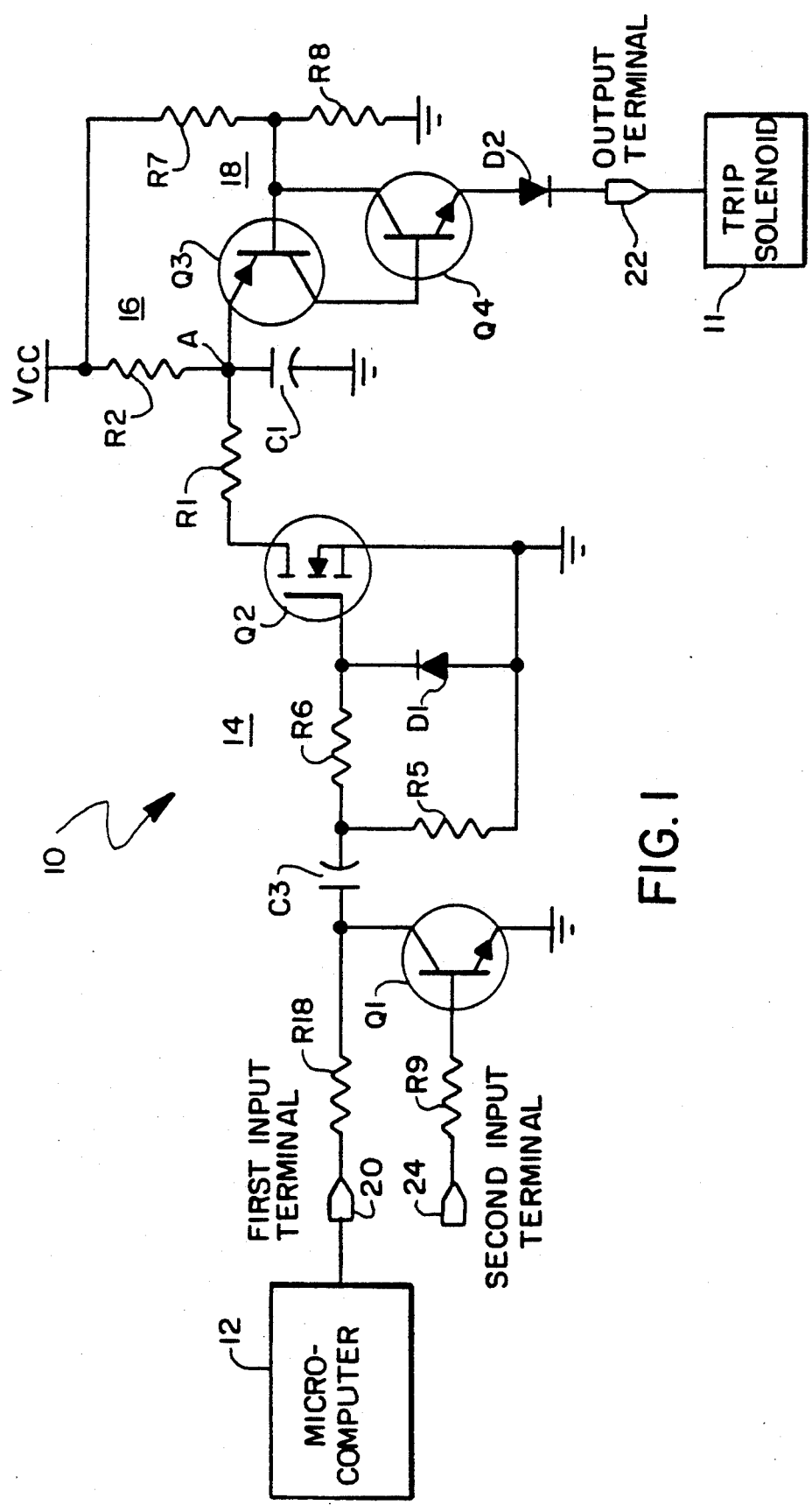
FIG. 1 is a detailed schematic circuit diagram of a microprocessor watch-dog monitor, constructed in accordance with the principles of the present invention.

Referring now to the drawings, there is shown in FIG. 1 a detailed schematic circuit diagram of an improved microprocessor watch-dog monitoring circuit 10 for use in association with microcomputer-based electronic trip units employed in solid-state circuit interrupters. The watch-dog monitoring circuit 10 serves to maintain the integrity of the microcomputer-based electronic trip units. In other words, the watch-dog monitoring circuit protects the trip units in the event of microcomputer malfunctions. Therefore, the watch-dog monitoring circuit 10 is designed to engage a trip solenoid 11 for breaking the current path in the circuit interrupter if the microcomputer 12 fails to reset it within a predetermined time period.

The watch-dog monitoring circuit 10 is comprised of an input switching circuit 14, a timing circuit 16, and a comparator circuit 18. The input circuit 14 includes an N-channel input field-effect transistor Q1, a current-limiting collector resistor R1, a base resistor R6, an input resistor R5, and a diode D1. The transistor Q1 has its drain connected to one end of the current-limiting resistor R1, its gate connected to one end of the base resistor R6, and its source connected to a ground potential GND. The anode of the diode D; is also connected to the ground potential and to one end of the input resistor R5, and the cathode of the diode D1 is connected to the gate of the transistor Q1. The other end of the resistor R5 is connected to the other end of the base resistor R6. The other end of the resistor R1 is connected to an internal node A.

The monitoring circuit 10 further includes an input terminal 20 and an output terminal 22. The input terminal 20 is coupled to the microcomputer 12 for receiving reset pulses in the form of a pulse train, each pulse having a pulse width of approximately 200 ms and a period of 500 ms. The amplitude of the pulses varies between zero and +5.0 volts. The input terminal 20 is connected to one end of an input resistor R18. The other end of the resistor R18 is connected to one end of a coupling capacitor C3. The other end of the capacitor C3 is connected to the junction of the resistors R5 and R6.

A second input transistor Q2 may be optionally provided for testing the watch-dog monitoring circuit by simulating a malfunction of the microcomputer 12 (i.e., reset pulses are stopped). As can be seen, the transistor Q2 has its collector connected to one end of the capacitor C3, its base coupled to a second input terminal 24 via a current-limiting resistor R9, and its emitter connected to the ground potential. In order to simulate a failure, the second input terminal 20 has applied thereto a voltage of +5.0 volts, thereby rendering the transistor Q1 non-conductive.

The timing circuit 16 is formed of a resistor R2 and a timing capacitor C1. One end of the resistor R2 is connected to a power supply potential VCC, which is typically at +12.0 volts. The other end of the resistor R2 is connected to one end of the capacitor C1 and to the internal node A. The other end of the capacitor C1 is connected to the ground potential.

The comparator circuit 18 includes a bipolar PNP-type switching transistor Q3, a bipolar NPN-type switching transistor Q4, and a voltage divider formed of resistors R7 and R8. The transistor Q3 has its emitter connected to the junction of the resistor R2 and the capacitor C1 at the internal node A, its base connected to the collector of the transistor Q4, and its collector connected to the base of the transistor Q4. One end of the resistor R7 is also connected to the power supply potential VCC. The other end of the resistor R7 is connected to one end of the resistor R8 and to the collector of the transistor Q4. The other end of the resistor R8 is connected to the ground potential.

A diode D2 has its anode connected to the emitter of the transistor Q4 and its cathode connected to the output terminal 22. The output terminal 22 provides an output signal for energizing the trip solenoid 11.

The operation of the microprocessor watch-dog monitoring circuit 10 will now be explained with reference to the waveforms of FIG. 2. Under normal operating conditions, the logic high reset pulses on the input terminal 20 will be regularly generated (every 200 ms) by the microcomputer 12. The reset pulses are passed through the resistor R18, the capacitor C3, and . the resistor R6 to the gate of the input transistor Q1. As a result, the input transistor Q1 will be turned on periodically so as to discharge the capacitor C1 via the resistor R1 and the drain-source junction of the transistor Q1. However, if the microcomputer 12 malfunctions functions so as to stop the generation of the periodic reset pulses the input transistor Q1 will remain in the non-conductive state. It should be noted that this "failed" condition can be simulated by supplying a voltage of +5.0 volts to the base of the second input transistor Q2.

Figure 2:
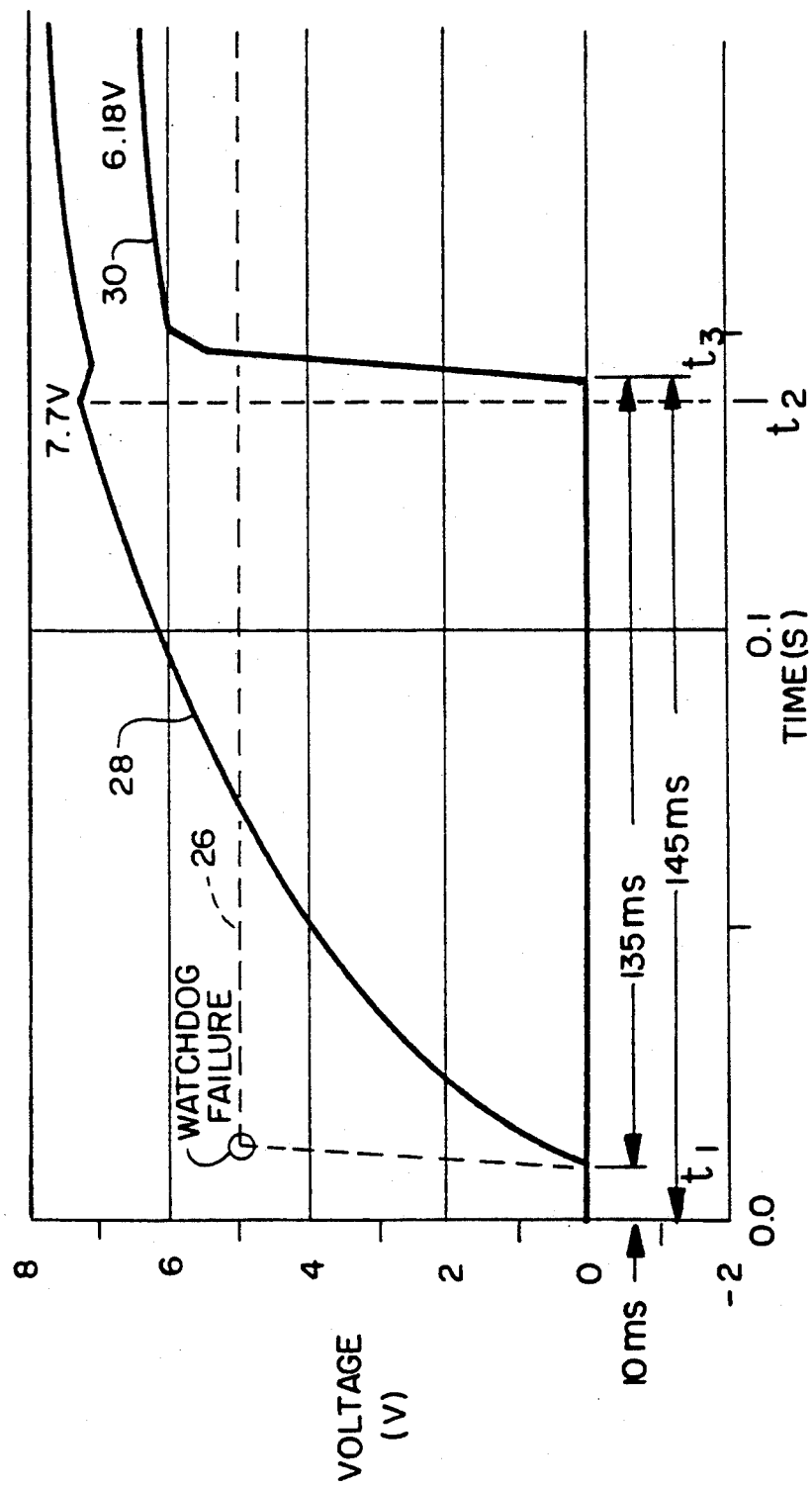
FIG. 2 are waveforms at various points in the circuit of FIG. 1, useful in understanding its operation.

In the "failed" condition, as designated at time t1 in the waveform 26 in FIG. 2, the capacitor C1 will begin to charge up along the waveform 28 in FIG. 2. At the time t2 when the voltage defining a turn-on signal on the capacitor C1 is greater than the reference voltage $V_{ref}$ on the base of the transistor Q3 by a $V_{be}$, the transistor Q3 will be turned on so as to pull up the base of the transistor Q4. Consequently, the transistor Q4 will also be rendered conductive. When the transistor Q4 turns on, the output voltage $V_{out}$ of +6.18 on the waveform 30 in FIG. 2 will appear at the output terminal 24 at the time t3. This high voltage on the output terminal 24 is used to engage or energize the trip solenoid 11, thereby interrupting the current path in the circuit breaker. As can be seen, the output voltage will be generated in approximately 133 ms after the malfunction of the microcomputer 12 or interruption of the reset pulses.

For completeness in the disclosure of the above described microprocessor watch-dog monitoring circuit but not for the purposes of limitation, the following representative values and component identifications are submitted. These values and components were employed in a circuit that was constructed and tested and which provides a high quality performance. Those skilled in the art will recognize that many alternative elements and values may be employed in constructing circuits in accordance with the present invention.

| PART | TYPE or VALUE |
| --- | --- |
| R1 | 18 ohms |
| R2 | 75K ohms |
| R5 | 27K ohms |
| R6 | .1 ohms |
| R7 | 10K ohms |
| R8 | 14K ohms |
| R9 | 1K ohms |
| R18 | 100 ohms |
| C1 | .22 uf |
| C3 | .001 uf |
| D1 | IN4148 |
| D2 | BAZ 170 |
| Q2 | BS 170 |
| Q3 | 2N3906 |
| Q1,Q4 | 2N3904 |

From the foregoing detailed description, it can thus be seen that the present invention provides an improved microprocessor watch-dog monitor for electronic trip units which includes a comparator circuit formed of a first bipolar transistor of the PNP-type conductivity and a second bipolar transistor of the NPN-type conductivity. The watch-dog monitor of the present invention provides for more reliable operation and performance at reduced cost than those traditionally available.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A microprocessor watch-dog monitor for electronic trip units comprising:
   an input transistor (Q1) having its gate coupled to an input terminal (20) and its source connected to a ground potential;
   a first resistor (R1) having its one end connected to the drain of said input transistor (Q1) and its other end connected to an internal node (A);
   a timing circuit (16) of a second resistor (R2) and a capacitor (C1), said second resistor (R2) having its one end connected to a power supply potential (VCC) and its other end connected to one end of said capacitor (C1) and to said internal node (A), the other end of said capacitor (C1) being connected to the ground potential;
   a comparator circuit (18) formed of a first switching transistor (Q3) and a second switching transistor (Q4);
   said first switching transistor (Q3) having its emitter connected to said internal node (A);
   said second switching transistor (Q4) having its base connected to the collector of said first switching transistor (Q3), its collector connected to the base of said first switching transistor (Q3), and its emitter coupled to an output terminal (22); and
   a voltage divider formed of third and fourth resistors (R7, R8), said third resistor (R7) having its one end connected to the power supply potential (VCC) and its other end connected to the collector of said second switching transistor (Q3) and to one end of said fourth resistor (R8), the other end of said fourth resistor (R8) being connected to the ground potential.

2. A microprocessor watch-dog monitor as claimed in claim 1, wherein said input transistor (Q1) is comprised of an N-channel field-effect transistor.

3. A microprocessor watch-dog monitor as claimed in claim 2, wherein said first switching transistor (Q3) is a bipolar transistor of the PNP-type conductivity.

4. A microprocessor watch-dog monitor as claimed in claim 3, wherein said second switching transistor (Q4) is a bipolar transistor of the NPN-type conductivity.

5. A microprocessor watch-dog monitor as claimed in claim 1, further comprising a second input transistor (Q2) having its base coupled to a second input terminal (24), its collector coupled to the base of said first input transistor (Q1), and its emitter connected to the ground potential.

6. A microprocessor watch-dog monitor as claimed in claim 1, wherein said first input terminal (20) is connected to a microcomputer (12) for receiving reset pulses to render periodically said input transistor (Q1) to be conductive.

7. A microprocessor watch-dog monitor as claimed in claim 6, wherein said timing circuit (16) generates a turn-on signal to the emitter of said first switching transistor (Q3) after the absence of the reset pulses for a predetermined time to render said first and second switching transistors (Q3, Q4) to be conductive thereby producing an output signal at the output terminal (22).

8. A microprocessor watch-dog monitor as claimed in claim 7, further comprising a trip solenoid which is energized in response to said output voltage for interrupting a current path in a circuit interrupter.

9. A microprocessor watch-dog monitor as claimed in claim 1, further comprising a diode having its cathode connected to the base of said input transistor (Q1) and its anode connected to the ground potential.

10. A microprocessor watch-dog monitor for electronic trip units, comprising:
    input transistor means (14) responsive to reset pulses for resetting periodically timing means (16);
    said timing means (16) for generating a turn-on signal after the absence of the reset pulses for a predetermined time at an internal node (A);
    a comparator circuit (18) formed of a first switching transistor (Q3) and a second switching transistor (Q4);
    said first switching transistor (Q3) having its emitter connected to said internal node (A);
    said second switching transistor (Q4) having its base connected to the collector of said first switching transistor (Q3), its collector connected to the base of said first switching transistor (Q3), and its emitter coupled to an output terminal (22);
    a voltage divider formed of first and second resistors (R7, R8), said first resistor (R7) having its one end connected to a power supply potential (VCC) and its other end connected to the collector of said second switching transistor (Q3) and to one end of said second resistor (R8), the other end of said second resistor (R8) being connected to a ground potential; and
    said first and second switching transistors (Q3, Q4) being turned on in response to said turn-on signal to produce an output signal at the output terminal.

11. A microprocessor watch-dog monitor as claimed in claim 10, wherein said input transistor (Q1) is comprised of an N-channel field-effect transistor.

12. A microprocessor watch-dog monitor as claimed in claim 11, wherein said first switching transistor (Q3) is a bipolar transistor of the PNP-type conductivity.

13. A microprocessor watch-dog monitor as claimed in claim 12, wherein said second switching transistor (Q4) is a bipolar transistor of the NPN-type conductivity.

14. A microprocessor watch-dog monitor as claimed in claim 10, further comprising second input transistor means coupled to said first input transistor means for testing the operation of said watch-dog monitor.

15. A microprocessor watch-dog monitor as claimed in claim 10, further comprising a trip solenoid which is energized in response to said output voltage for interrupting a current path in a circuit interrupter.

* * * * *